(No Model.)
W. R. HOFFMANN.
PEN HOLDER.
No. 452,013. Patented May 12, 1891.
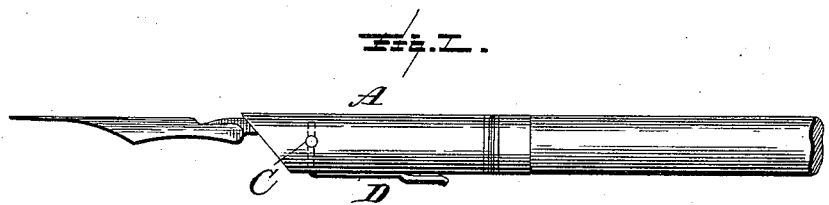
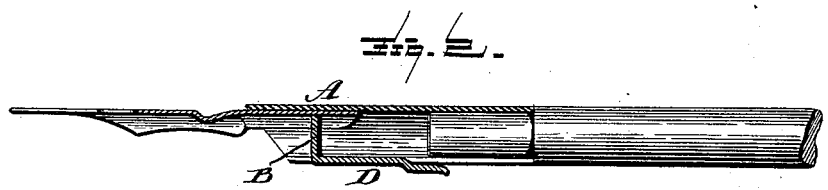
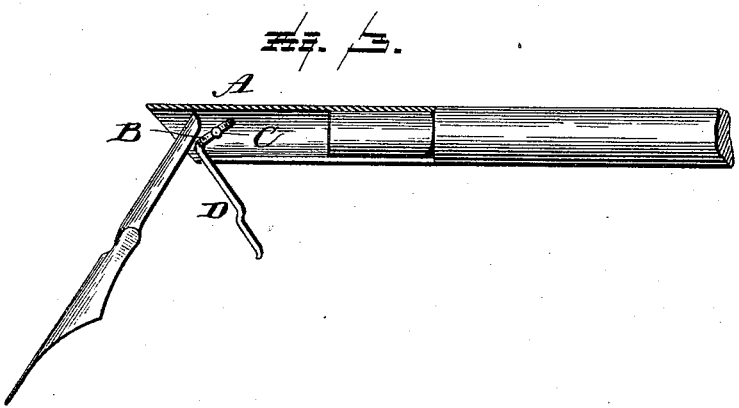

UNITED STATES PATENT OFFICE.

WILLIAM R. HOFFMANN, OF ST. JOSEPH, ASSIGNOR TO CHARLES A. GAISER AND LOUIS C. IRVINE, BOTH OF KANSAS CITY, MISSOURI.

PEN-HOLDER.

SPECIFICATION forming part of Letters Patent No. 452,013, dated May 12, 1891.

Application filed September 10, 1890. Serial No. 364,559. (No model.)

*To all whom it may concern:*

Be it known that I, WILLIAM R. HOFFMANN, a citizen of the United States, residing at St. Joseph, in the county of Buchanan and State of Missouri, have invented a new and useful Improvement in Pen-Holders, of which the following is a specification.

This invention relates to the improvement of pen-holders, so that great facility is afforded in putting in and taking out the pen and held more firmly than heretofore, and yet is easily and quickly dropped out without being touched by the fingers.

My invention consists of certain details of construction, which will be more fully explained by reference to the drawings herewith, in which—

Figure 1 is a side view of the holder with the pen in position. Fig. 2 is a section of the same, while Fig. 3 is a section showing the pen falling out or being released.

Similar letters refer to similar parts in each view.

The cylindrical case A is of the common form, and may be extended to make the entire handle as well as socketed upon a stick, as shown in the drawings. At a convenient point within the case there is a clamping-dog B, pivoted on the trunnions C, which passes through the case, as shown in Fig. 1. This dog is provided with an extension or tail D, which acts as a lever to operate it with. While the pen is in position the tail D lies for the greater part of its length in a slot in the bottom of the cylinder. A short portion of it is, however, offset slightly, so as to enable the catching of it when desirous of removing the pen. This is simply done by depressing the lever, when the dog D releases the pen and the pen drops out. The trunnions C of the dog D being formed in one piece with dog, the dog is placed in position by spreading the cylinder slightly till the trunnions will pass into position. A slot can, however, be cut from the trunnion-bearing reaching to the end of the holder, so that the trunnions may pass in without the cylinder being spread. The form shown in the drawings is preferred.

Having thus described my invention, what I claim, and desire to have secured to me by Letters Patent, is—

1. A pen-holder consisting of a cylindrical barrel and the pivoted clamping-dog B, between which and the barrel the pen is inserted and directly grasped and held, as shown and set forth.

2. A pen-holder consisting of a cylindrical barrel, the pivoted clamping-dog B, between which and the barrel the pen is inserted and directly grasped and held, and the handle D for operating said dog, as shown and set forth.

WILLIAM R. HOFFMANN.

Witnesses:
THOMAS A. SQUIRES,
J. C. BOTELER.